Oct. 23, 1945.　　　　S. SMITH　　　2,387,687
TRUCK SELF LOADER ATTACHMENT
Filed Feb. 20, 1945　　　3 Sheets-Sheet 3
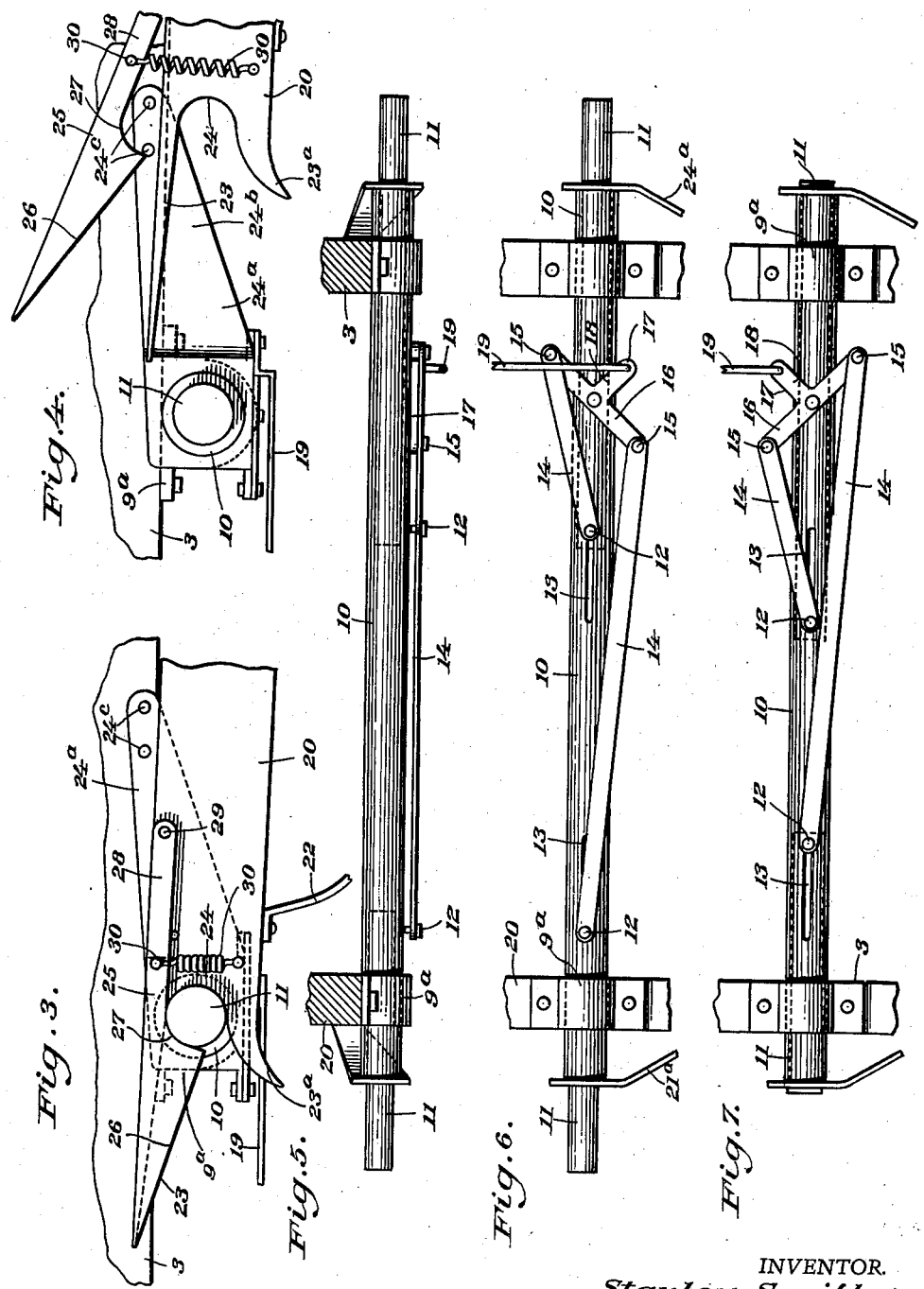
INVENTOR.
Stanley Smith
BY Victor J. Evans & Co.
ATTORNEYS Patented Oct. 23, 1945

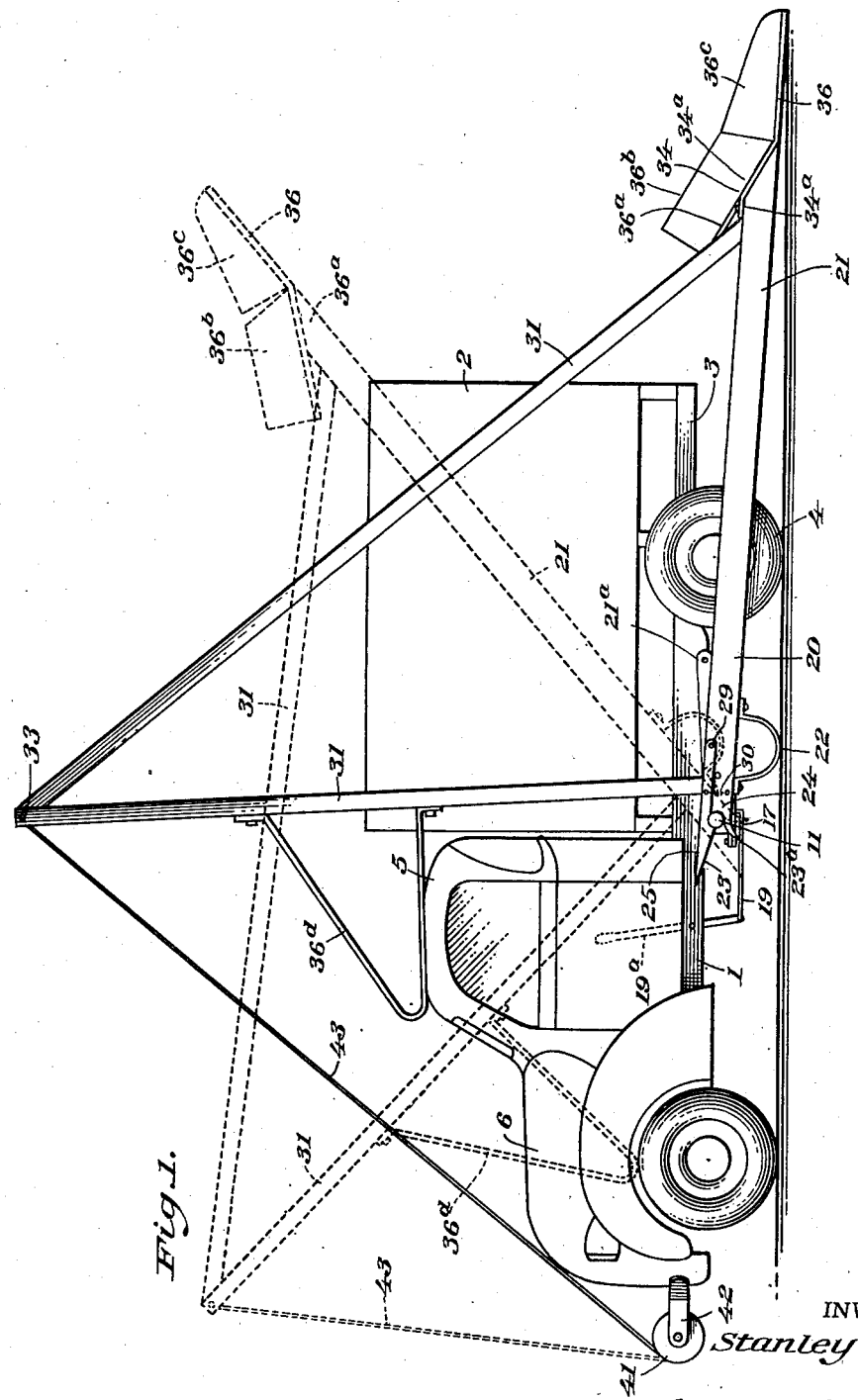

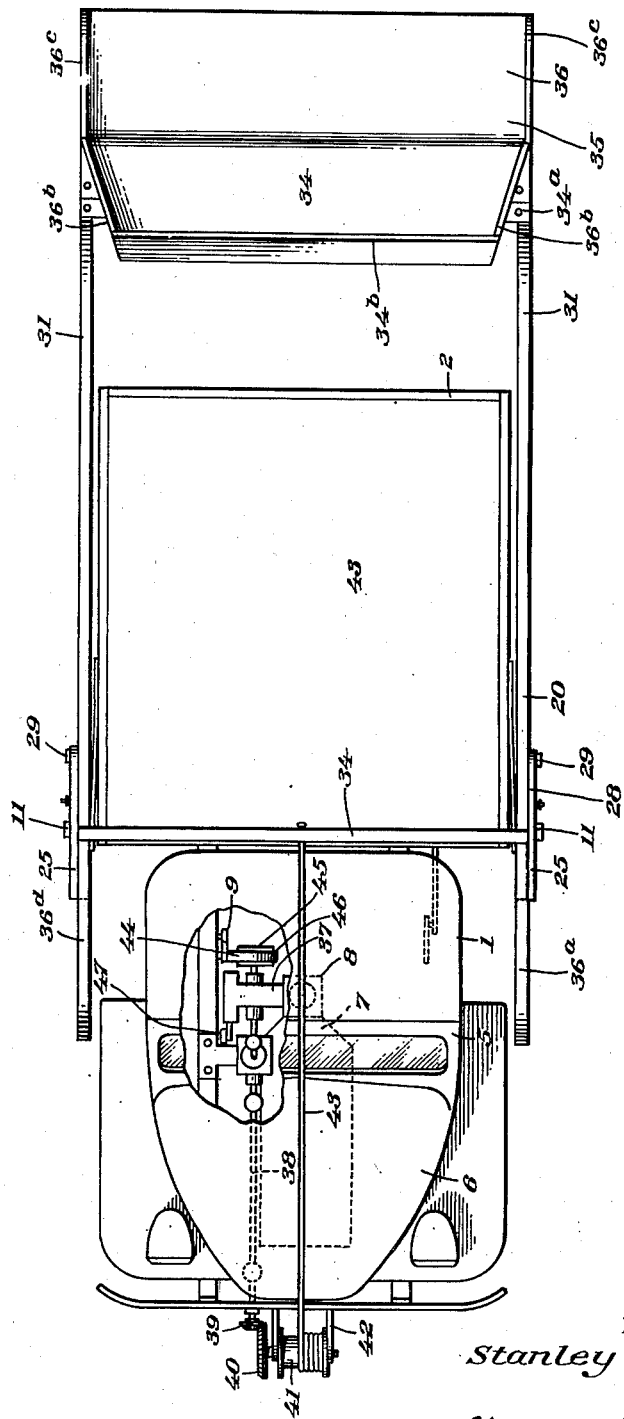

2,387,687

UNITED STATES PATENT OFFICE 2,387,687

TRUCK SELF-LOADER ATTACHMENT

Stanley Smith, Bend, Oreg.

Application February 20, 1945, Serial No. 578,833

9 Claims. (Cl. 214—78)

My present invention, in its broad aspect, has to do with improvements in truck loaders to enable an operator to gather and load material into the truck body such as logs, fuel, gravel, coal and the like. My truck loader apparatus is detachable or demountable when not in use and is powdered from a power take-off from the truck motor, furthermore, the scoop used with my loader may have either a solid plate bottom, a reticulated bottom, or may be formed with spaced floor strips, or with teeth, and the operator can see the loader frame through the windshield when the loader is in dumping position.

More particularly, it is my purpose to provide a device of this general character which has a frame into which the vehicle may be backed for attachment. The frame carries a rake or shovel device or toothed scoop at its rear end and has a detachable pivotal connection at its front end with the vehicle so that when the material to be loaded is engaged, the back end of the frame is lifted bodily by a cable connected with a power-take-off from the vehicle motor and pivoted about the pivotal connection to dump the material to be loaded into the vehicle body. Furthermore, when in dumping position, the frame is braced to the ground so that tipping and the like is prevented.

There is also provided an improved means for attaching the frame pivotally to the truck body, and improved means for latching it in attached position. My power take-off is controlled by the vehicle brake pedal and operates through a lifting cable and drum to elevate and drop the frame, and the frame is exceptionally sturdy, efficient and simple, and is highly practical for the purposes intended, and the scope has side plates to securely hold the material therein.

I provide novel and practical guide means for the frame as this powered vehicle is backed into the frame, and one of said guide means function as a brace for the attaching bars.

Other objects and advantages of my invention will be apparent from the foregoing detailed description and drawings of a preferred form used for illustration, but it is pointed out that changes in form, size, shape, construction and arrangement of parts may be made, provided they fall within my broad inventive concept and the scope of the appended claims.

In the drawings wherein a preferred form of my invention is illustrated:

Figure 1 is a side elevation of my invention applied to a truck, the dumping position being indicated in dotted lines;

Figure 2 is a top plan view with the hood of the truck broken away to show the power take-off mechanism;

Figure 3 is a detail view of the side bars of the frame pivoted to the truck and shows the guides;

Figure 4 is a view of the side bars of the frame released from the truck and also shows the guides;

Figure 5 is a view of the extensible pivoting bar and support with the ends extended to be engaged by the frame;

Figure 6 is a detail of the means for extending the ends of the bar and support, such means being shown in position with the ends extended, and Figure 7 is a view similar to Figure 6 with the ends retracted.

In the drawings wherein like characters of reference are used to designate like or similar parts throughout the several views:

The numeral 1 designates a truck of conventional type having a body 2, a chassis 3, rear wheels 4, a cab 5, a hood 6, a motor 7, a transmission 8, and a brake mechanism and lever 9.

Mounted in brackets 9a beneath the chassis 3 and ahead of the rear wheels 4 is a hollow bar 10. Telescoping within the ends of the bar 10 are extension bars 11 each carrying at its inner end a pin 12 which fits into and extends through a slot 13 in the hollow bar 10. Engaging each pin 12 is a link 14, one being relatively short and the other long, and each link is pivotally connected as at 15 to an arm 16 of a T-shaped operating lever 17, the remaining arm 18 of which is pivotally connected with a rod 19 reaching to the cab 5 and connected with an operating handle 19a to be moved to throw the extension bars 11 in-and-out of the bar 10—see Figures 5—6—7.

When in their outermost position, as shown in Figures 5 and 6, the bars 11 are engaged by the side rails 20 of a rectangular frame 21. Each side rail 21 has a U-shaped supporting foot 22 which normally keeps it at such a height from the ground that it will readily engage the bars 11—see Figure 1—and each rail is provided with a beveled, forwardly projecting extension 23 and a downwardly curved guide lip 23a to insure proper alignment of the recess 24 with the bar 11 and to facilitate backing a truck into connecting engagement with the frame. The semi-circular recess 24 in the end of each rail 20 is between the extension 23 and lip 23a to properly receive the bar 11. A second guide plate 24a goes about the bar 11 and is extended at 24b and attached to the frame at 24c. Guide plate 24a serves as a reinforcement for the bar 11. A pivoted latch 25 having a beveled end 26 and a semi-circular face 27 is provided on each rail, and each latch has a shank 28 pivoted as at 29 to the rail to be moved into engagement with the bar—as shown in Figure 3—to hold the rail in engagement with the bar. A coil spring 30 is provided to hold the latch in closed position, as in Figure 3, and against the tension of which the latch may be moved to open position as shown in Figure 4.

Attached to side rails 20 of the frame 21 adjacent the rods 11 are angular uprights 31 bolted together at the top as at 33, and to a transverse cross piece 34—see Figure 2. Removably attached as at 34a to the side rails 20 and rear upright 31 is the inclined part 34 of a scoop or flat shovel 36—a rake or the like may be substituted—which extends somewhat back of the body of the truck and has an upwardly inclined back 36a. Side pieces 36b and 36c are attached to the scoop and inclined toward its forward edge.

Attached to the uprights 31 intermediate their ends are feet 36d which are located between the ends of uprights 31 and disposed to engage the ground as shown in dotted lines in Figure 1 when the frame and scoop are in dumping position, and by reason of the position of the frame, it can be viewed through the windshield by the operator when in dumping position. It will be noted that the upper side plates or pieces 36b are inclined inwardly toward the truck to guide the material and prevent displacement. My scoops are detachable through removal of attaching means 34a.

In operation, a truck is backed into the frame and the frame latched to the bars 11 which have been placed in extended position. When the scoop or shovel 36 is in the full line position of Figure 1 backing of the truck will engage coal, cord wood or the like and fill the scoop or shovel, it is then elevated to the dotted line position shown in Figure 1 and the contents dumped into the body of the truck. The part 34 is inclined to facilitate loading the scoop and properly dumping the contents into the body.

In order to elevate the frame—or rather pivot it about the bars 11 as a fulcrum—I provide a universally connected power take-off 37 with a shaft 38 leading to a drive pinion 39 at the front of the vehicle—see Figure 2—where a beveled gear 40 on a rotatable drum 41 is provided to drive the drum 41. The drum is pivotally mounted in brackets 42 and has a cable 43 leading upwardly to the cross piece 34 of the frame. Winding and unwinding of the cable 43 on the drum 41 raises and lowers the frame. A connection 44 to the brake lever 9 of the truck brakes the shaft 38 through a brake drum 45 and band, 46 as shown in Figure 2 to control the movement of the frame, and a lever 47 controls the operation of the power take-off 37.

From the foregoing, it is believed that the operation and advantages of my invention will be apparent, but it is again emphasized that interpretation thereof should only be conclusive when made in the light of the subjoined claims.

I claim:

1. A truck loader for use with a truck having a brake mechanism and a power take-off, comprising an extensible rod fixed to the truck, means for extending and retracting the rod, a frame having its front end pivotally and detachably engaged with the rod, a material engaging means on the rear of the frame, standards on the frame, a cable drum connected with the power take-off of the truck, the cable connected with the standards to raise and lower the frame, means connected with the brake mechanism for controlling the cable, and means for latching the frame on the rod.

2. The device as defined in claim 1 wherein the extensible rod includes a hollow body and slidable telescoping members at the ends, and link means for extending and withdrawing the telescoping members.

3. The device as defined in claim 1 wherein the frame has a U-shaped support for mounting the same in position to engage the rod, and wherein beveled extensions on the frame facilitate mounting the same on the rod.

4. The invention as defined in claim 1 wherein the latching means has pivoted latch devices with shanks pivoted to the frame, and springs to hold the latches in latching position.

5. The invention as defined in claim 1 wherein the frame includes side rails formed with semi-circularly cut-out ends engaging the extensible rods, and the standards include angular members attached at their tops to a transverse member.

6. The invention as defined in claim 1 wherein the extensible ends on the rod have pins engaged by links, said links engaging a T-shaped lever and a rod and operating handle connected with the T-shaped lever.

7. A truck loader, comprising a pivoted frame, a material engaging element carried on the rear part of the frame, means for detachably coupling the frame to a truck body, a drum connection to a power take-off of a truck a cable on said drum adapted to elevate the frame means connected to the brake mechanism of said truck for controlling the cable on said drum, means engaging the ground and carried by the frame for supporting the frame in dumping position, a spring latch device for holding the frame on the truck body, and plural guide means for centering and aligning the frame with an element of the frame to connect the same thereto, and side plates on the material engaging element.

8. The invention as defined in claim 7 wherein the truck body is provided with attaching rods, guides engaging the rods, one of the frame elements engaging the rods, and guides on the frame element, certain of said guides being downwardly curved, and the others extending forwardly, and the latch devices being spring actuated to a closed position and being located adjacent said latter guides.

9. The invention as defined in claim 7 wherein said frame supports are carried between the ends of uprights of the frame, and wherein certain of the side plates of the material engaging element are inwardly flared, and others are inclined.

STANLEY SMITH.